DIGITAL COMPUTER THEORY TRAINING MACHINE

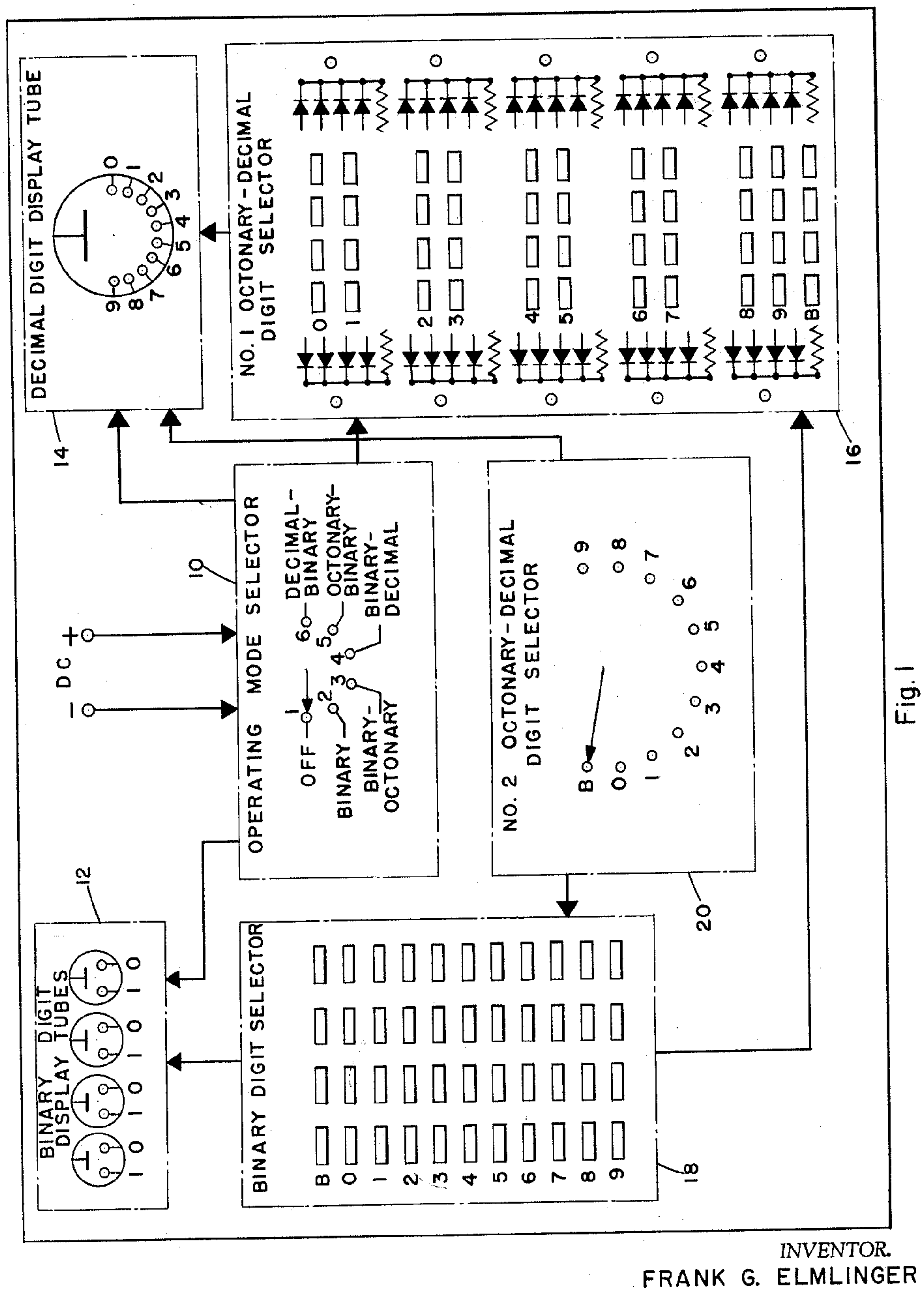
Fig. I
INVENTOR.
FRANK G. ELMLINGER
BY *Knox & Knox*

Filed Sept. 10, 1962

INVENTOR.
FRANK G. ELMLINGER
BY
Knox & Knox

INVENTOR.
FRANK G. ELMLINGER
BY
Knox & Knox

3,162,960
DIGITAL COMPUTER THEORY TRAINING MACHINE

Frank G. Elmlinger, San Diego, Calif., assignor to Sherry Griswold Foundation, doing business as Electronic Technical Institute Filed Sept. 10, 1962, Ser. No. 222,605
7 Claims. (Cl. 35—30)

This invention relates generally to training aids and devices and more particularly to a device that provides training in design of digital computer switching circuits for conversion of numbers from one system to another in the binary, octonary and decimal number systems.

*Background*

Digital computer switching circuits are provided in various forms and combinations, all well known to the art. A majority of digital computers perform computations in the binary number system, a simple counting system that contains only two digits, 0 and 1. Since the decimal number system, containing the digits 0 through 9, is used universally for arithmetical operations, digital computers must be capable of converting input data from the decimal to the binary number system before performing computations. Then, after performing computations in the binary number system, digital computers must be capable of converting output data from the binary to the decimal number system.

Switching circuits used in digital computers for conversion of numbers from one system to another use electronic components such as semi-conductor diodes, monostable multivibrators, magnetic cores, relays, and so on. Such circuits operate with speeds measured in fractions of a microsecond. Consequently, operation of digital computer switching circuits is not observable except in comparing input data with output data.

This invention enables students to design and construct switching circuits composed of manually operated switches, semi-conductor diodes, and resistors. The switching circuits operate visual display devices that compare input data with output data and enable students to check the accuracy of switch settings and to make switching changes when necessary. Additionally, voltage test points enable students to measure voltages at various points in the switching circuits and verify that the switching circuits are operating in accordance with design principles.

For example, to convert binary data 1001 to an equivalent decimal digit 9, binary digit selector switches are set so that the binary digit display device displays the digits 1001. Then the decimal digit selector switches are set so that the decimal digit display device displays the digit 9. Only one combination of switch settings will provide these two displays. An error in one switch setting will cause an error in one display or the other.

*Objects*

It is a principal object of this invention to provide a training device that enables students to design and construct a plurality of number conversion switching circuits.

It is another object of this invention to provide a training device that displays digits in the binary, octonary, and decimal number systems for comparison of one system with another.

It is still another object of this invention to provide a training device that enables students to verify that number conversion switching circuits are operating in accordance with design principles.

With these and other objects definitely in view, this invention consists in the novel combination and arrangement of elements as will be hereinafter fully described in the specification, particularly pointed out in the claims, and illustrated in the drawings that form a material part of this disclosure, and of which:

FIGURE 1 is a functional block diagram; and

Similar characters of reference indicate similar or identical parts and portions throughout the several views.

Figure 2A:
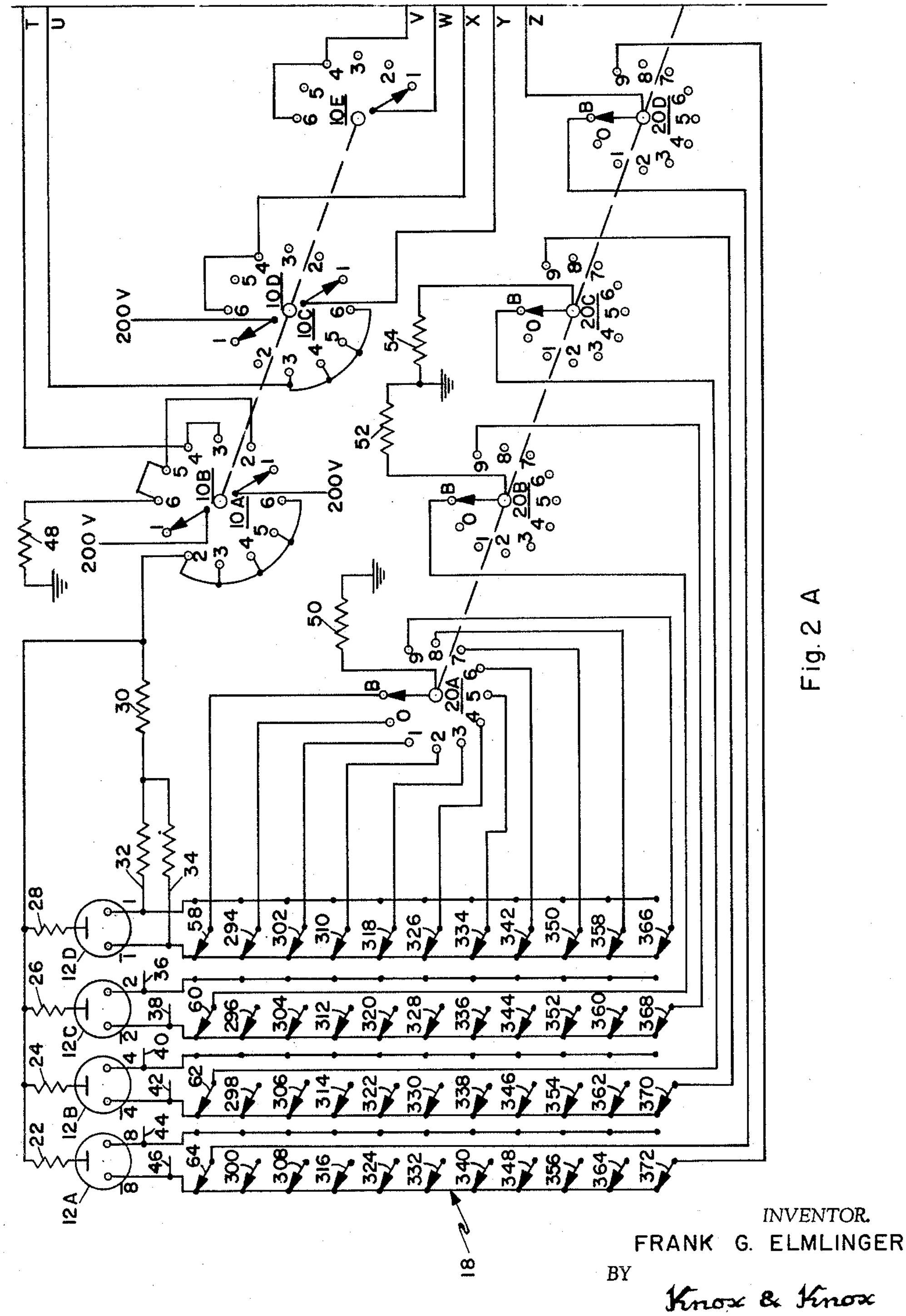
FIGURES 2A and 2B are portions of a schematic diagram of this invention.

The various elements of this invention are mounted on a panel approximately as shown in FIGURE 1. The illustrated number of tubes and switches is, of course, exemplary only of one practical embodiment of the invention. Direct current operating voltage for the panel is applied by Operating Mode Selector 10 to four Binary Digit Display Tubes 12, a Decimal Digit Display Tube 14, and No. 1 Octonary-Decimal Digit Selector No. 16. Operating Mode Selector 10 is a 6-position, 5-deck rotary switch that provides five operating modes as shown. Binary Digit Selector 18 is an assembly of 44 single-pole, double-throw switches arranged in four 11-switch groups, one group for each Binary Digit Display Tube 12. The top set of four switches labeled B is used to select 0 or 1 digits for display by each of the four Binary Digit Display Tubes 12 when No. 2 Octonary-Decimal Digit Selector 20 is in the position labeled B. This No. 2 Octonary-Decimal Digit Selector 20 is an 11-position, 5 deck rotary switch that causes the corresponding digits 0 through 9 to be displayed by Decimal Digit Display Tube 14, when the switch is in one of the 0 through 9 positions. One of the 4-switch sets labeled 0 through 9 in Binary Digit Selector 18 is used to select 0 or 1 digits for display by each of the four Binary Digit Display Tubes 12 when Octonary-Decimal Digit Selector No. 2 correspondingly is in one of the 0 through 9 positions. The No. 1 Octonary-Decimal Digit Selector 16 is an assembly of 40 semiconductor diodes and 44 single-pole, double-throw switches arranged in four 11-switch groups, the four groups being used in conjunction with the 4-switch set labeled B in Binary Digit Selector 18. The 4-switch set labeled B is mechanically linked to the 4-switch set labeled B in Binary Digit Selector 18, while the 4-switch sets labeled 0 through 9 are used with the semiconductor diodes to select the corresponding 0 through 9 digit displayed by Decimal Digit Display Tube 14.

When Operating Mode Selector 10 is in the Binary position No. 2 Octonary-Decimal Digit Selector is placed in the B position, and the 4-switch set labeled B in Binary Digit Selector 18 is used to select the 0 or 1 digit displayed by Binary Digit Display Tubes 12. During this operating mode, Decimal Digit Display Tube 14 and the No. 1 Octonary-Decimal Digit Selector are disabled.

When Operating Mode Selector 10 is in the Binary-Octonary position, the other switches are used as described for the Binary Operating Mode. Additionally, Decimal Digit Display Tube 14 is enabled except for the 8 and 9 cathodes, No. 1 Octonary-Decimal Digit Selector 16 is enabled, and the appropriate 4-switch set is used to cause Decimal Digit Display Tube 14 to display the octonary digit corresponding in numerical value to the binary digits displayed by Binary Digit Tubes 12.

When Operating Mode Selector 10 is in the Binary Decimal position, the other switches are used as described for the Binary-Octonary operating mode. Additionally, cathodes 8 and 9 are enabled in Decimal Digit Tube 14.

When the Operating Mode Selector 10 is in the Octonary Binary position, cathodes 8 and 9 of decimal Digit Display Tube 14 are disabled, No. 1 Octonary-Decimal Digit Selector 16 is disabled, and No. 2 Octonary-Decimal Digit Selector 20 is used to select the digit 0 through 7 displayed by Decimal Digit Display Tube 14. Dependent on the position of No. 2 Octonary-Decimal Digit Selector 20, the 4-switch set with the same position label in Binary Digit Selector 18 is used to cause Binary Digit Display Tubes 12 to display the binary digit equivalent of the octonary-digit displayed by Decimal Digit Display Tube 14. When Operating Mode Selector 10 is in the Decimal Binary position, the other switches are used as described for the Octonary-Binary operating mode. Additionally, cathodes 8 and 9 are enabled in Decimal Digit Display Tube 14.

*Binary Mode*

To use this invention to demonstrate the binary number system, Operating Mode Selector 10 is placed in the Binary position No. 2 Octonary-Decimal Digit Selector 20 is placed in the B position, and Binary Digit Selector 18 is used to select the digits displayed by Binary Digit Display Tubes 12.

Figure 2B:
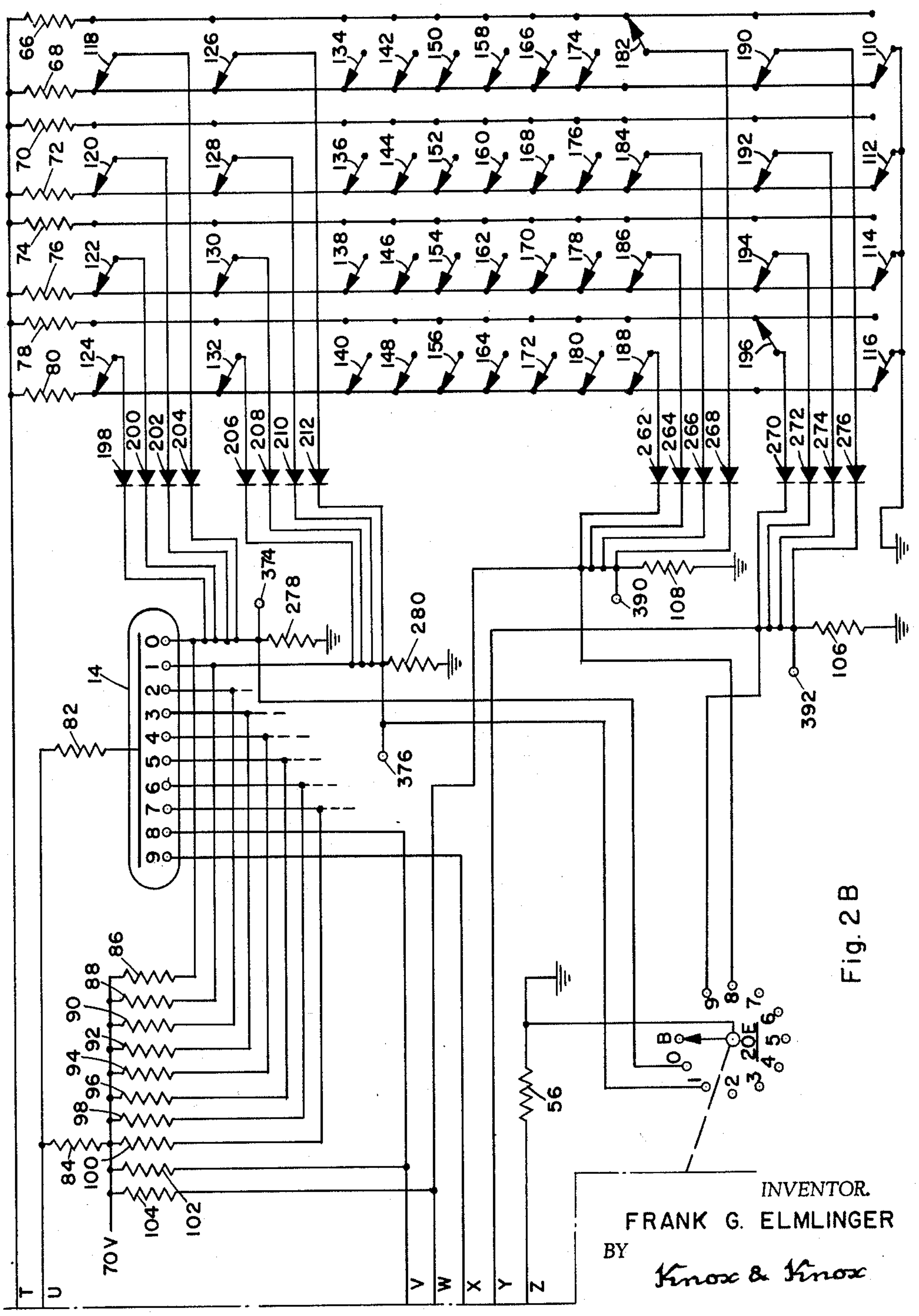

Referring to FIGURE 2, switch 10A applies operating D.C. to tubes 12A–12D. D.C. is applied to the anodes through anode resistors 22–28 and to the cathodes through voltage dropping resistor 30 and cathode resistors 32–46. Switch 10B connects load resistor 48 across the D.C. supply.

Switches 20A–20D connect cathode resistors 50–56 to the moving arms of switches 58–64. Switches 58–64 then are moved to one position or the other to select a 0 or 1 digit for display by tubes 12A–12D.

*Binary-Octonary Mode*

To use this invention to demonstrate conversion of digits in the binary number system to a digit in the octonary number system, Operating Mode Selector 10 is placed in the Binary-Octonary position, No. 2 Octonary-Decimal Digit Selector 20 is place din the B position, Binary Digit Selector 18 is used to select the digits displayed by Binary Digit Display Tubes 12, and No. 1 Octonary-Decimal Digit Selector 16 is used to select the digit displayed by Decimal Digit Display Tube 14.

Referring to FIGURE 2, switch 10A applies operating D.C. to tubes 12A–12D as in the Binary Operating Mode. Switch 10B disconnects load resistor 48 from the D.C. supply and applies D.C. operating voltage to No. 1 Octonary-Decimal Digit Selector 16 through resistors 66–80. Switch 10C applies operation D.C. to tube 14. D.C. is applied to the anode through anode resistor 82 and to the cathodes through voltage dropping resistor 84 and cathode resistors 86–104. Switches 10D and 10E disconnect cathodes 8 and 9 of tube 14 from ground return through resistors 106 and 108.

The effect and use of switches 20A–20D and 58–64 is the same as described in the Binary operating mode.

The moving arm of switches 110–116 are connected mechanically to the moving arm of switches 58–64, respectively. Consequently, the binary digits selected by switches 58–64 determines the closed position of switches 110–116. The closed positions of switches 110–116 complete the ground return for thusly connected resistors 66–80 and causes a voltage drop across said resistors. As a result of the voltage drops, switches 118–196 that are closed in the same positions as switches 110–116 apply zero voltage to diodes 198–276. Consequently all diodes thusly connected to zero voltage do not conduct through ground return cathode resistors 106, 108, and 278–292. For resistors 66–80 that are connected to the open positions of switches 110–116, the ground return path is through switches 118–196 that are closed to the open positions of switches 110–116. In this case, diodes 198–276 connected thereto do conduct through resistors 106, 108, and 280–292 connected thereto. The voltage drop developed across any resistor 106, 108, and 280–292 prevents the cathode connected thereto from illuminating and displaying the associated digit in tube 14. Consequently, for tube 14 to display the octonary digit equivalent of the binary digits displayed by tubes 12A–12D, all four switches connected through diodes to the cathode that controls the desired octonary digit are closed in the same closed positions as switches 110–116, and at least one switch in each of the other 4-switch sets that are connected through diodes to the other cathodes must be closed in the open position of one of switches 110–116.

*Binary-Decimal Mode*

Operation of this invention to demonstrate binary to decimal digit conversion is the same as for the Binary-Octonary operating mode except Operating Mode Selector 10 is placed in the Binary-Decimal position and Switches 10D and 10E connect cathodes 8 and 9 of tube 14 to ground return through resistors 106 and 108.

Switch positions in FIGURE 2 illustrate conversion of the binary digits 0000 to the decimal digit 0. Switches 58–64 are closed in the 0 cathode position enabling tubes 12A–12D to display the binary digits 0000. Switches 110–116 are closed to the same relative positions as switches 58–64, completing the ground return path for resistors 68, 72, 76, and 80. Switches 118–124 are closed to the same closed positions as switches 110–116, diodes 198–204 are non-conducting, the voltage drop developed across cathode resistor 278 is determined by current flowing through resistors 278, 86, and 84, and the 0 cathode of tube 14 enables tube 14 to display the decimal digit 0.

In the 4-switch set that controls the 8 cathode of tube 14 consisting of switches 182–188, switch 182 is closed to the open position of switch 110 causing diode 268 to conduct through resistors 108 and 66 and developing an additional voltage drop across cathode resistor 108 that disables the 8 cathode.

Similiarly, switch 196 in the 4-switch set that controls the 9 cathode of tube 14 is closed to the open position of switch 116 disabling the 9 cathode. At least one switch in the 4-switch sets that control the 1 through 7 cathode of tube 14 must be closed to an open position of one of switches 110–116. Otherwise, tube 14 will display other digits in addition to the digit 0.

The effect of all switch settings on cathodes 0 through 9 of tube 14 may be observed by taking voltage readings at test points 374–392 and the exposed connections of diodes 198–276 with the movable arms of switches 118–196. A minimum voltage reading at test point 374 indicates that none of diodes 198–204 is conducting. This may be verified by measuring zero voltage at each diode 198–204. An increased voltage reading at test point 392 indicates that at least one diode 270–276 is conducting. Individual voltage readings at diodes 270–276 indicate the conducting and non-conducting diodes. Similar voltage readings at the other test points and other diodes provide indications of the operating status of all switching combinations of No. 1 Octonary-Decimal Digit Selector 16.

*Octonary-Binary Mode*

To demonstrate conversion from octonary to binary digits, Operating Mode Selector 10 is placed in the Octonary-Binary position, No. 2 Octonary-Decimal Digit Selector 20 is placed at the position labeled with the octonary digit 0 through 7 to be displayed by tube 14, and Binary Digit Selector 18 is used to select the binary digits displayed by Binary Digit Display Tubes 12.

Referring to FIGURE 2, switch 10A applies operating D.C. to tubes 12A–12D as in the Binary Operating Mode. Switch 10B connects load resistor 48 across the D.C. supply and disables No. 1 Octonary-Decimal Digit Selector 16. Switch 10C applies operating D.C. to tube 14 as in the Binary-Octonary Mode. And switches 10D and 10E disable cathodes 8 and 9 of tube 14 by disconnecting the ground returns through positions 8 and 9 of switch 20E.

Switches 20A–20D connect a 4-switch set from switches 294–372 to ground through cathode resistors 50–56, the 4-switc hset so connected being dependent on the 0 through 7 position of switches 20A–20D. The selected 4-switch set is used to select the combination of binary digits displayed by tubes 12A–12D.

Switch 20E connects one of the 0 through 7 cathodes of tube 14 directly to ground, dependent on the 0 through 7 position of switch 20E, enabling tube 14 to display the selected octonary digit.

*Decimal-Binary Mode*

Operation of this invention to demonstrate decimal to binary digit conversion is the same as for the Octonary-Binary Operating Mode except Operating Mode Selector Switch 10 is placed in the Decimal-Binary position and switches 10D and 10E connect cathodes 8 and 9 of tube 14 to positions 8 and 9 of switch 20E.

It is understood that minor variation from the form of the invention disclosed herein may be made without departure from the spirit and scope of the invention, and that the specification and drawing are to be considered as merely illustrative rather than limiting.

I claim:

1. In a training device for conversion of numbers from one system to another in the binary, octonary, and decimal number systems, the combination comprising:
   first display means for visual display of digits in the binary number system;
   second display means for visual display of digits in the octonary and decimal number systems;
   first switching means for providing a plurality of operating modes and connecting a D.C. source to said first and second display means;
   second switching means for selecting the combination of digits displayed by said first display means;
   third and fourth switching means for selecting the digit displayed by said second display means; and
   voltage measuring means for said third switching means.

2. In a training device for conversion of numbers from one system to another in the binary, octonary, and decimal number systems, the combination comprising:
   first display means for visual display of digits in the binary number system comprising a plurality of numeral indicator tubes, each having means for displaying the digits 0 and 1;
   second display means for visual display of digits in the octonary and decimal number systems comprising a numeral indicator tube having means for displaying the digits 0 through 9;
   first switching means for providing a plurality of operating modes and connecting a D.C. source to said first and second display means comprising a manually operated rotary switch having a plurality of positions and a plurality of decks, a separate position being provided for the OFF position and each of the BINARY, BINARY-OCTONARY, BINARY-DECIMAL, OCTONARY-BINARY, and DECIMAL-BINARY operating modes;
   second switching means for selecting the combination of digits displayed by said first display means comprising a plurality of manually operated single-pole, double-throw switches arranged in equal groups, one group for each numeral indicator tube in said first display means, the fixed terminals of all switches in each group being connected in parallel, one set of fixed terminals being connected to the 0 cathode and the other set of fixed terminals being connected to the 1 cathode of a numeral indicator tube in said first display means, the movable arms of all swtiches being arranged to operate in equal sets, each set containing one switch from each group;
   third switching means for selecting the digit displayed by said second display means in the BINARY-OCTONARY and BINARY-DECIMAL operating modes comprising a plurality of semiconductor diodes and a plurality of manually operated, single-pole, double-throw switches arranged in equal groups, one group for each group in said second switching means, the fixed terminals of all switches in each group being connected in parallel, each set of fixed terminals being connected to a D.C. source, the movable arms of all switches being arranged to operate in equal sets, each set containing one switch from each group, each of the movable arms of one set being connected mechanically to a movable arm of a switch in one set of switches in said second switching means and further connected to ground, the movable arms of each of all other sets being connected in parallel and further connected through one of said semiconductor diodes to one of the 0 through 9 cathodes of the numeral indicator tube in said second display means;
   fourth switching means for selecting the digit displayed by said second display means in the OCTONARY-BINARY and DECIMAL-BINARY operating modes comprising a manually operated rotary switch having a plurality of positions and a plurality of decks, a separate position being provided for the BINARY operating mode and each of the 0 through 9 cathodes in said second display means; and
   voltage measuring means for said third switching means comprising a plurality of test points, one connected to each of the 0 through 9 cathodes of the numeral indicator tube in said second display means and one at the point of connection of each of said movable arms with one of said semiconductor diodes.

3. In a training device for demonstrating the binary number system, the combination comprising:
   display means for visual display of digits in the binary number system comprising a plurality of numeral indicator tubes, each having means for displaying the digits 0 and 1;
   first switching means that connect a D.C. source to said numeral indicator tubes;
   second switching means for selecting the combination of digits displayed by said numeral indicator tubes comprising a plurality of manually operated single-pole, double-throw switches, one for each said numeral indicator tube, one fixed terminal of each switch being connected to the 0 cathode and the other fixed terminal of each switch being connected to the 1 cathode of one of said numeral indicator tubes; and
   third switching means for causing said numeral indicator tubes to display the combination of digits selected by said second switching means comprising a plurality of manually operated switches, one switch for each switch in said second switching means, the fixed terminal of each switch in said third switching means being connected to the moving arm of a switch in said second switching means, the moving arm of each switch in said third switching means being connected to ground.

4. Apparatus according to claim 3, wherein second display means for visual display of digits in the octonary and decimal number systems, is a numeral indicator tube having means for displaying the digits 0 through 9 suitably connected to a D.C. source by said first switching means, and with the 8 and 9 cathodes disabled by said first switching means; and
   fourth switching means for selecting the digit displayed by said second display means comprising a plurality of semiconductor diodes and a plurality of manually operated, single-pole, double-throw switches arranged in equal groups, one group for each switch in said second switching means, the fixed terminals of all switches in each group being connected in parallel, each set of fixed terminals being connected to a D.C. source, the movable arms of all switches being arranged to operate in equal sets, each set containing one switch from each group, each of the movable arms of one set being connected mechanically to a movable arm of a switch in said second switching means, and further connected to ground, the movable arms of each of all other sets being connected in parallel and further connected through one of said semiconductor diodes to one of the 0 through 7 cathodes in said second display means.

5. Apparatus according to claim 4 in which the 8 and 9 cathodes of said second display means are enabled by said first switching means by connecting each of said 8 and 9 cathodes through said semiconductor diodes to the movable arms of a set of switches in said fourth switching means.

6. In a training device for demonstrating conversion of digits in the octonary number system to digits in the binary number system, the combination comprising:

first display means for visual display of digits in the binary number system comprising a plurality of numeral indicator tubes, each having means for displaying the digits 0 and 1;

second display means for visual display of digits in the octonary and decimal number systems comprising a numeral indicator tube having means for displaying the digits 0 through 9;

first switching means that connect a D.C. source to said first and second display means and disable the 8 and 9 cathodes in said second display means;

second switching means for selecting the combination of digits displayed by said first display means comprising a plurality of manually operated single-pole, double-throw switches arranged in equal groups, one group for each numeral indicator tube in said first display means, the fixed terminals of all switches in each group being connected in parallel, one set of fixed terminals being connected to the 0 cathode and the other set of fixed terminals being connected to the 1 cathode of a numeral indicator tube in said first display means, the movable arms of all switches being arranged to operate in equal sets, each set containing one switch from each group;

third switching means for selecting the digit displayed by said second display means comprising a manually operated rotary switch having a plurality of positions and a plurality of decks, the moving arm of each deck being connected to ground, a position being provided in each deck for each of the 0 through 9 cathodes in said second display means, corresponding positions in one deck being connected to the 0 through 7 cathodes each of corresponding positions in each of all other decks being connected to the moving arm of a switch in a group of switches in said second switching means.

7. Apparatus according to claim 6 in which the 8 and 9 cathodes of said second display means are enabled by said first switching means by connecting said 8 and 9 cathodes to positions 8 and 9 in one deck of said third switching means.

References Cited by the Examiner

UNITED STATES PATENTS

| | | | |
|---|---|---|---|
| 2,665,070 | 1/54 | Avery | 235—155 X |
| 2,928,600 | 3/60 | Fleming | 235—155 |
| 3,027,080 | 3/62 | Thorsson | 235—155 |
| 3,055,121 | 9/62 | Neal | 35—31 |

JEROME SCHNALL, *Primary Examiner.*

GEORGE A. NINAS, Jr., *Examiner.*